United States Patent Office 3,832,215
Patented Aug. 27, 1974

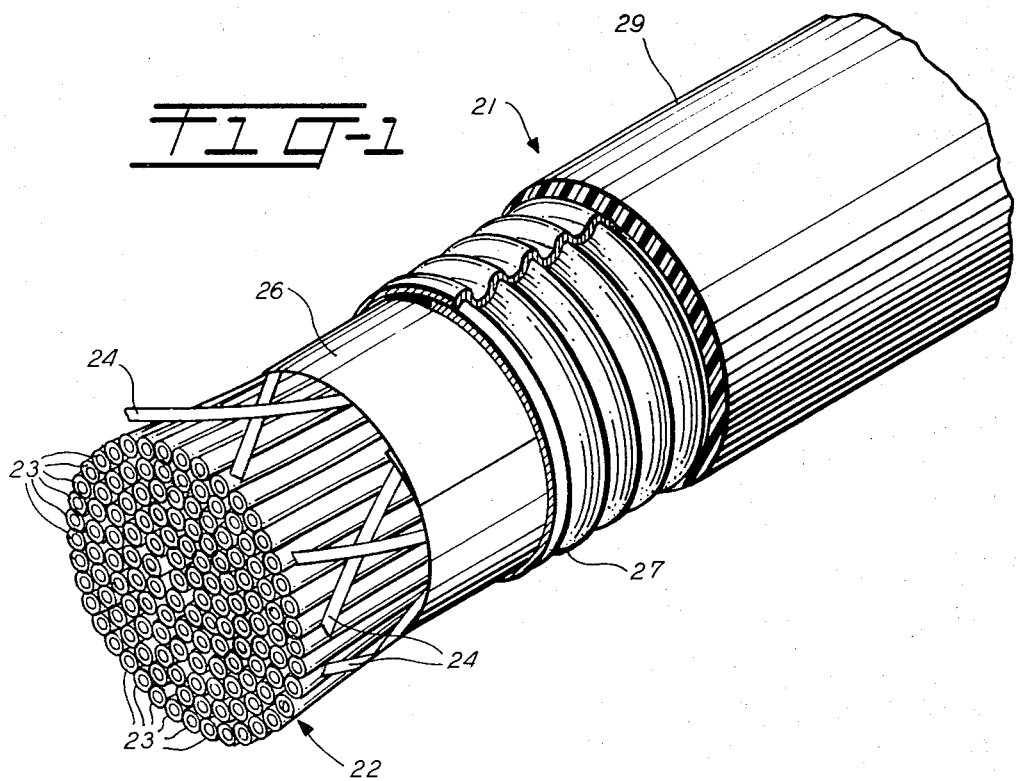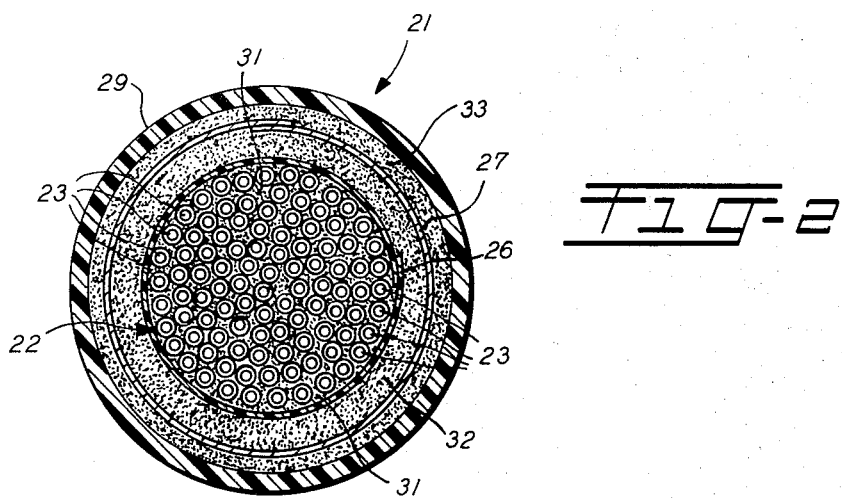

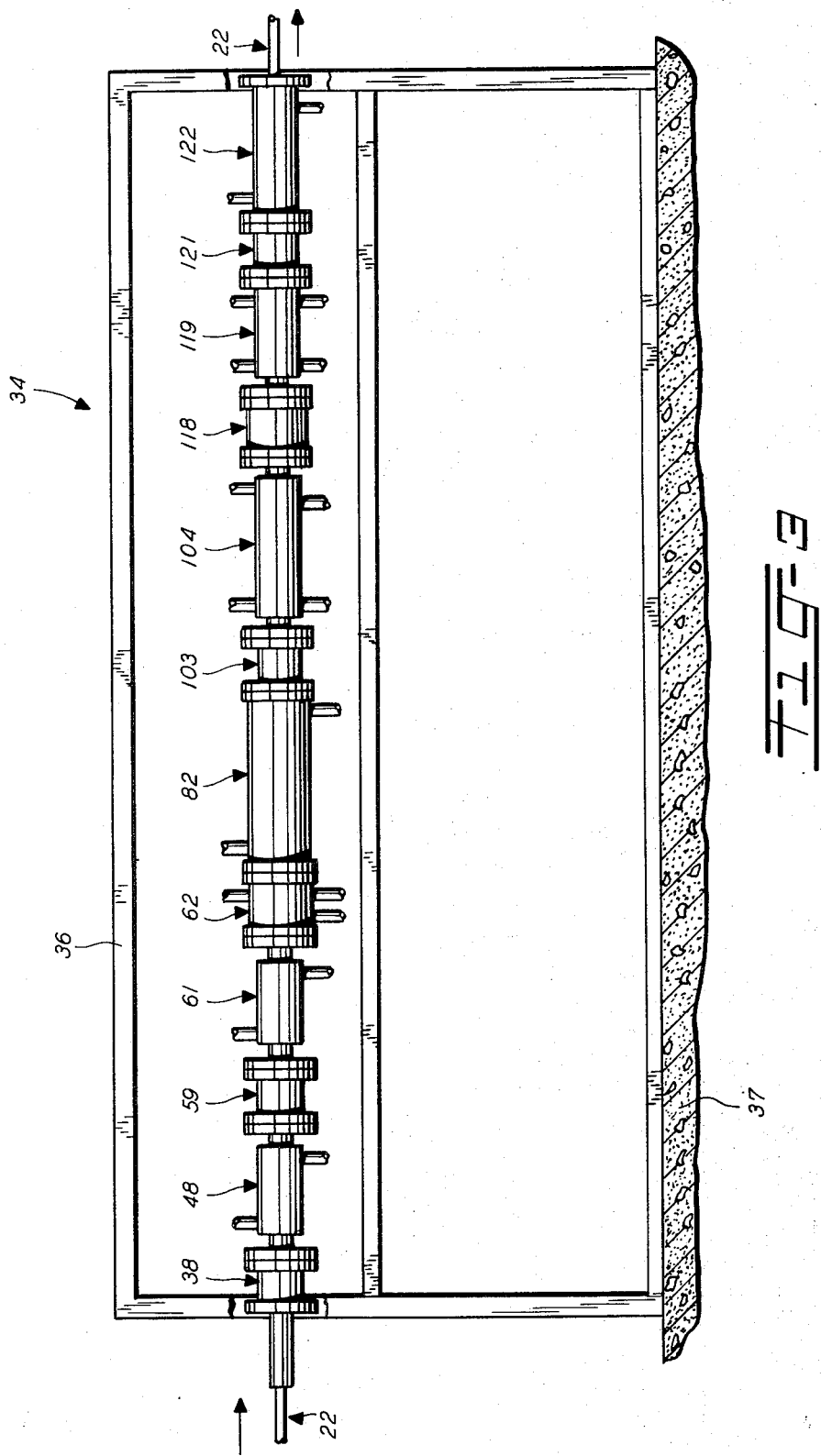

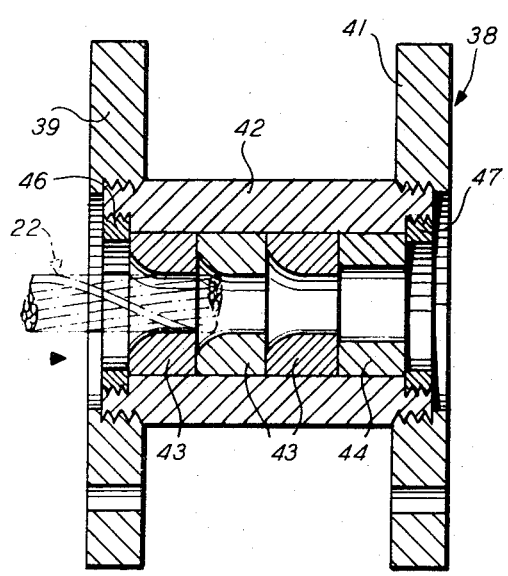
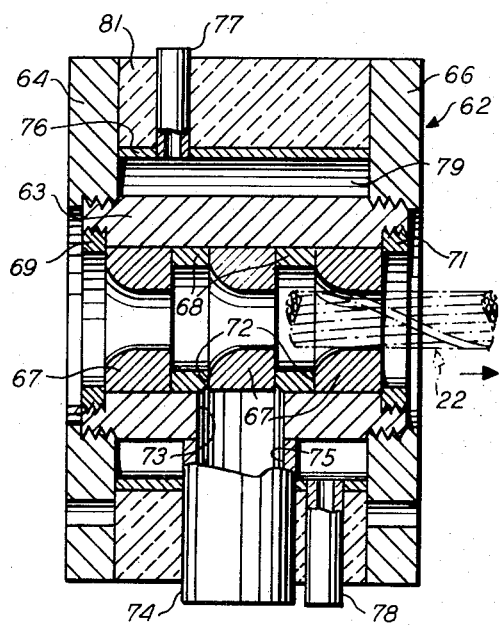
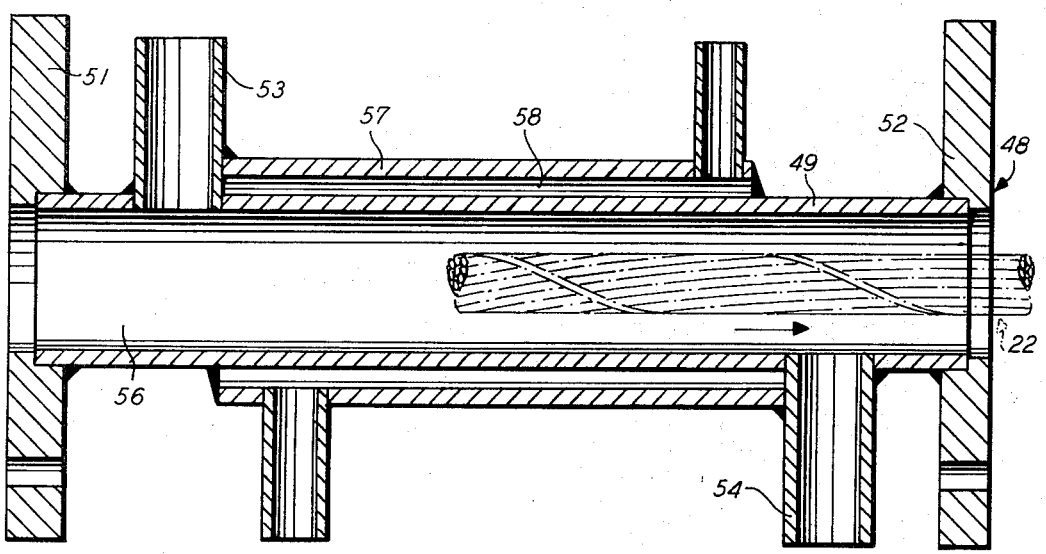

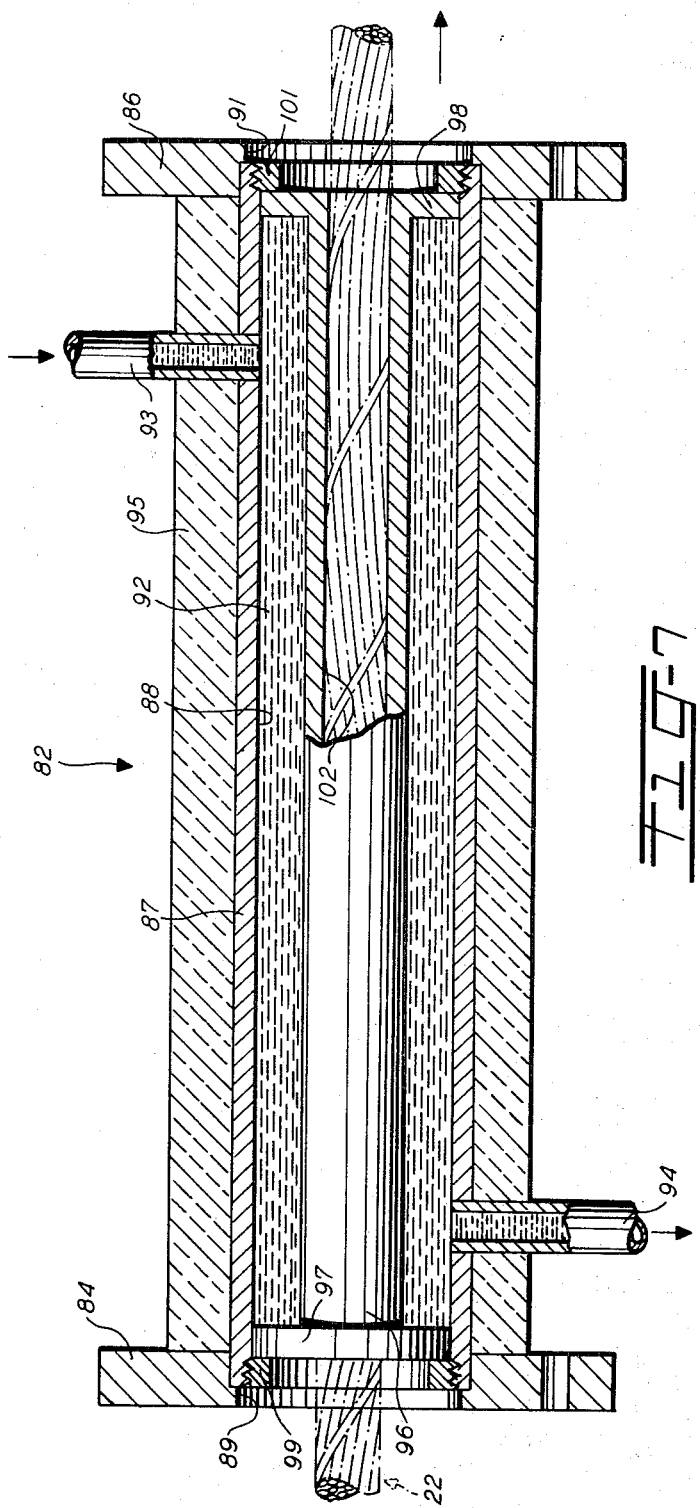

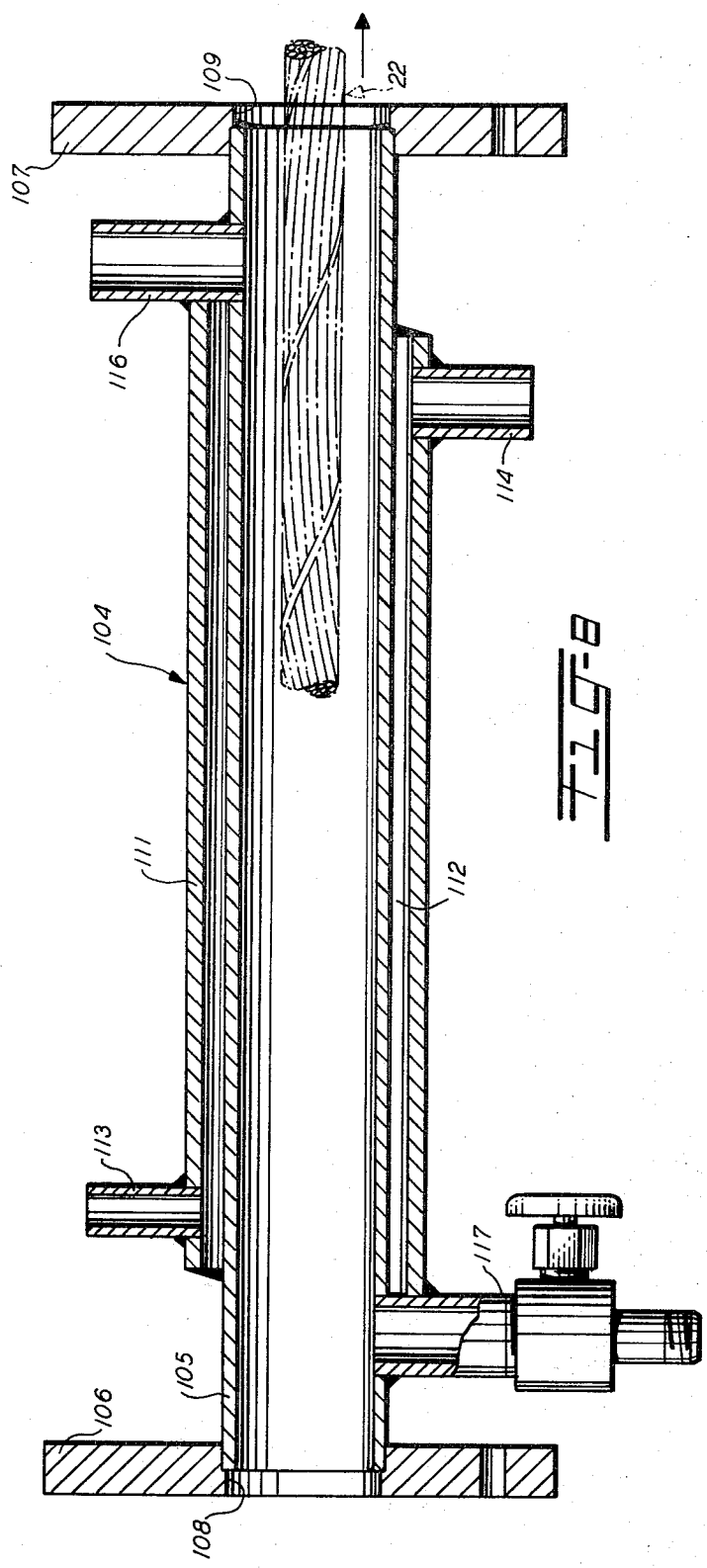

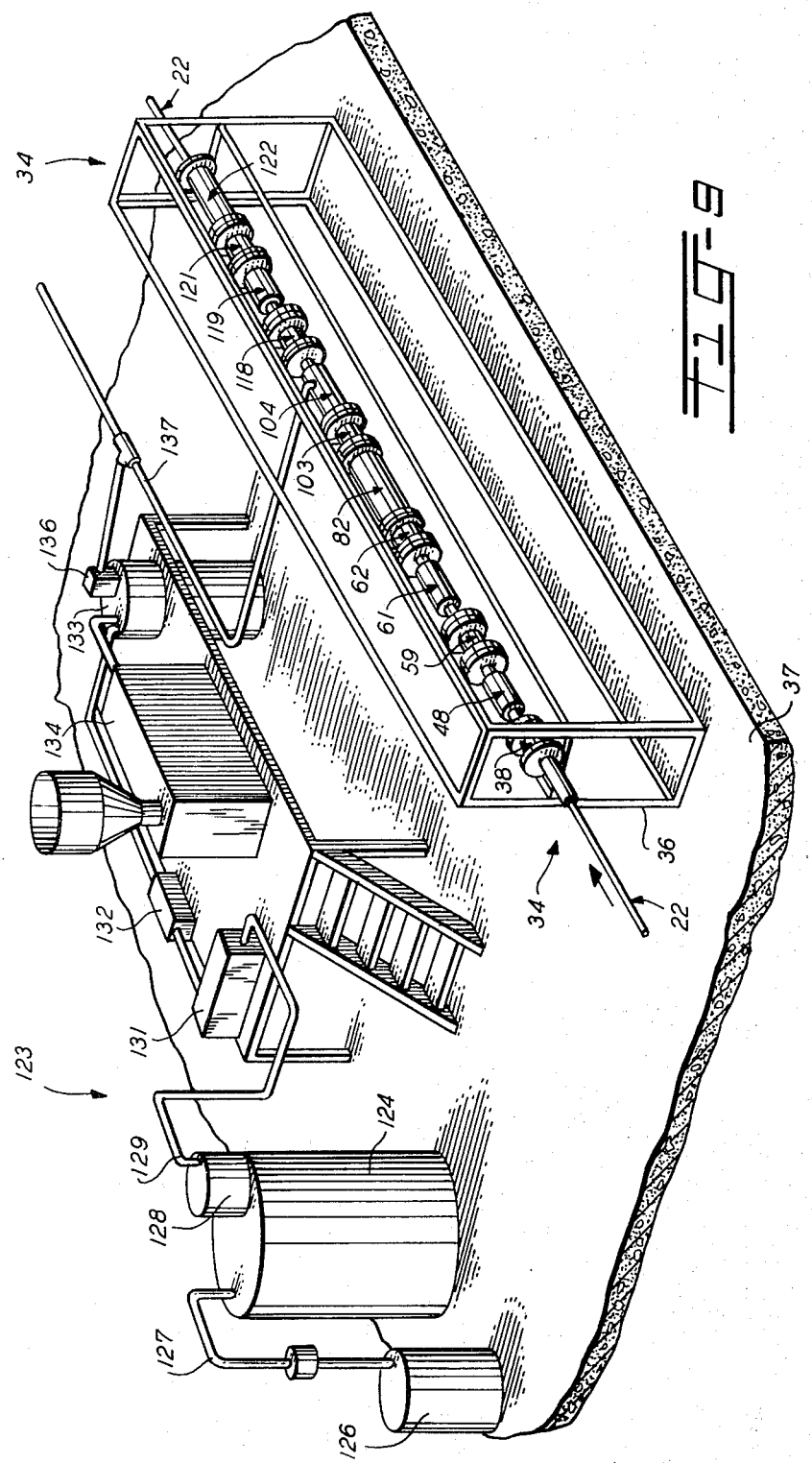

3,832,215
METHODS OF MANUFACTURING WATERPROOF CABLE
Edward L. Franke, Jr., Perry Hall, and William J. Hyde, Baltimore, Md., assignors to Western Electric Company, Incorporated, New York, N.Y.
Continuation of application Ser. No. 155,055, June 21, 1971. This application June 13, 1973, Ser. No. 369,653
Int. Cl. B05c 3/12; H01b 13/06
U.S. Cl. 117—61     3 Claims

ABSTRACT OF THE DISCLOSURE

A cable core having stranded twisted pairs of insulated conductors is moved axially through a series of in-line chambers having interconnect dies to facilitate the evacuation of air from voids of the interstitial structure of the core and the pressure-application of a waterproofing compound of jelly-like consistency into the air-evacuated voids.

The compound-filled cable core is then passed through various stations where core wrap and sheathing materials are placed about the core in combination with additional application of the waterproofing compound. A plastic jacket is extruded about the sheathing and is cooled prior to take-up of the jacketed cable onto a reel.

This is a continuation of application Ser. No. 155,055, filed June 21, 1971.

BACKGROUND OF THE INVENTION

(1) Field of the Invention

This invention relates to method of manufacturing waterproof cable, and particularly relates to methods of filling interstitial voids of a cable core with a waterproofing compound and further to the subsequent application of core wrap, sheathing and jacketing materials in combination with additional applications of the waterproofing compound about the cable core to form an essentially waterproof cable.

(2) Description of the Prior Art

In the manufacture of certain types of communications cables, such as those contemplated for use as underground or buried cable in telephone communications, individual bare conductors are coated by extrusion with an insulating material and each insulated conductor is subsequently twisted with another insulated conductor to form a twisted pair. A plurality of the twisted pair of insulated conductors are then stranded together to form a cable core. Colored binder ribbons are wound helically about the cable core for coding purposes. A thermal-barrier tape, referred to as a core wrap, and a metal sheathing are wrapped about the cable core and a jacketing layer of plastic insulation extruded over the sheathing.

Since cable of this type s contemplated for underground or buried usage, moisture diffusion into the interior of the core of the cable is likely, thereby resulting in corrosive attack and damage to the conductors and change in capacitance. Further, the presence of moisture within the cable core would result in the inefficient, and in some cases failure of, operation of telephone circuits formed by the conductors. It is also feasible that the jacket and sheathing could be broken open by external forces, such as shifting rock formations in the buried configuration or accidental blows to above-ground portions of the cable, which would immediately expose the cable core to moisture. Therefore, it is most desirable and necessary to protect the insulated conductors of the cable core to minimize the entry of moisture into the cable core.

One of the presently employed techniques for providing a protective shield includes the use of an adhesive-coated metal strip, which is wrapped longitudinally about the core wrap. When a jacket of hot plastic material is extruded about the adhesive coating of the metal, the metal is bonded to the inner wall of the jacket to thereby form a bonded sheath about the cable core. This bonded sheath provides a moisture barrier having characteristics which reduce the penetration of corrosive and damaging moisture into the core of the cable. In addition, the core of the cable may be subsequently pressurized, which also tends to reduce the opoprtunity for moisture to penetrate into the core.

Other techniques used to minimize the entry of moisture into the core of the cable include the flooding of voids of the interstitial structure of the core of the cable with a compound which has properties sufficient to minimize the entry of moisture into the core. It would be most desirable if the compound could be deposited or placed in all of the air spaces and voids within the core of the cable which make up the interstitial structure of the cable core. Since the twisted pairs of the core of the cable have been stranded, it is difficult to insure that all of the voids of the interstitial structure are filled with the compound, particularly those which occupy the axially central portions of the core.

In addition, the compound which is used to fill the voids of the interstitial structure of the cable core desirably and essentially replaces all of the air in the cable core. Therefore, the compound must have excellent electrical properties so that the compound-filled cable will maintain transmission characteristics which are at least as good as those of acceptable and proven cables having an air-filed core which utilize other techniques of moisture exclusion. In addition, the compound must possess excellent resistance to flow at certain atmospheric temperatures due to the fact that portions of the cable must be brought above ground for terminating purposes. Further, the compound must possess low-temperature properties, such as adhesion and resistance to cracking due to the handling of the cables in cold environments. Also the compound should not possess any toxic effects which would make the compound objectionable to handle by installation personnel who may have to come into intimate contact with the compound.

In an examination of various types of filling compounds whch could be used for waterproofing purposes in buried telephone cables, it was discovered that a mixture of petrolatum and low-density polyethylene in a precise blend would satisfy the requirements outlined above. However, the cost of mixing, handling and shipping of the blended compound to the point of use, and the necessity for the addition of an antioxidant to improve product quality due to long blending cycles, increased the cost of the compound significantly and tended to cause some concern as to the economc feasibility for using the precisely blended petrolatum-polyethylene blend as a waterproofing compound for buried telephone cables.

Therefore, suitable means had to be developed to overcome the difficulties and high costs encountered when the petrolatum-polyethylene waterproofing compound was blended at a distant location and transported to a location whereat the compound was to be injected into the core of the cable.

SUMMARY OF THE INVENTION

It is, therefore, an object of this invention to provide new and improved methods of manufacturing waterproof cable.

Another object of this invention is to provide new and improved methods of blending selected materials to form a waterproofing compound to eliminate the costly transportation of the blended compound from a mixing location to a location whereat the compound is to be applied to a cable core.

Still another object of this invention is the provision of methods of injecting and depositing a preblended waterproofing compound into the voids of the interstitial structure of a cable core.

A further object of this invention is to provide new and useful methods of blending a waterproofing compound in a workable and flowable state and immediately transferring the flowable compound into the voids of the interstitial structure of a cable core for waterproofing the core.

A still further object of this invention is to provide methods of depositing a waterproofing compound into the voids of the interstitial structure of an axially moving cable core and for thereafter applying sheathing and jacketing materials in combination with additional amounts of the waterproofing compound to manufacture a waterproof cable.

A method embodying certain principles of the invention may include the steps of evacuating air from the voids of the interstitial structure of the core of a cable, depositing a waterproofing compound in a workable state into the air-evacuated voids of the cable core, and placing the deposited waterproofing compound in a nonflowable state so that the deposited compound remains in the voids of the cores of the cable to exclude substantially the entry of moisture into the core.

BRIEF DESCRIPTION OF THE DRAWINGS

Other objects and advantages of the present invention will be apparent from the following detailed description when considered in conjunction with the accompanying drawings, in which:

FIG. 1 is a perspective view showing a portion of a communications cable;

FIG. 2 is a sectional view of a communications cable showing waterproofing compound located within the interstices of the core of the cable as well as other portions of the cable;

FIG. 3 is a plan view showing an apparatus for injecting waterproofing compound into the core of a cable embodying certain principles of the invention;

FIG. 4 is a sectional view showing a constrictor section for facilitating the passage of the cable core through an essentially air-tight passageway;

FIG. 5 is a sectional view of a vacuum section for developing a vacuum in the interstitial structure of a cable core;

FIG. 6 is a sectional view showing an insulated constrictor section;

FIG. 7 is a sectional view showing a cooling section for cooling a cable core moving therethrough;

FIG. 8 is a sectional view showing a compound-applying section for facilitating the application of a waterproofing compound to a cable core moving therethrough;

FIG. 9 is a perspective view of a compound mixing and blending area and the compound-application apparatus which is illustrated in FIG. 3;

DETAILED DESCRIPTION

Figure 10:
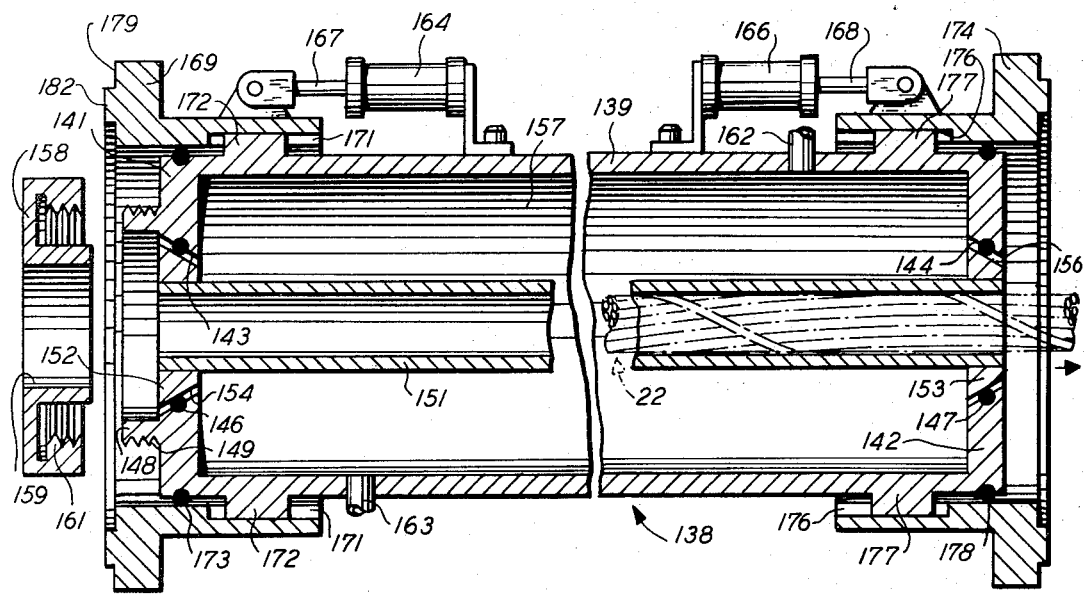
FIG. 10 is a sectional view showing a removable cooling section.

Referring to FIG. 1, there is illustrated a section of a communications cable, designated generally by the numeral 21. The cable 21 includes a cable core, designated generally by the numeral 22, composed of a plurality of stranded, insulated conductors 23—23 which form a plurality of twisted pairs. A plurality of colored binder ribbons 24—24 are wrapped about the stranded conductors 23—23 to provide a color code indication of certain aspects of the cable core 22. A core wrap 26, which is a plastic, thermal-barrier and dielectric tape, is wrapped longitudinally about the cable core 22. A corrugated aluminum shielding tape 27 is wrapped longitudinally about the core wrap 26, and provides a lightning shield for the cable core 22. A jacket 29 of insulating material is extruded about the corrugated tape 27 to complete the cable 21.

As illustrated in FIG. 2, the stranded, insulated conductors 23—23 are arranged in such a manner that air voids are normally formed in interstices 31—31 of the cable core 22. In order to reduce the opportunity for moisture to diffuse into and collect in the interstices 31—31 of the cable core 22, the air voids of the interstices are filled with a waterproofing jelly-like compound which is composed of a mixture of petrolatum and polyethylene. An example of a range of waterproofing compound which successfully accomplishes the waterproofing of the cable 21 includes a mixture of about 85% petrolatum and 15% low-density polyethylene to a mixture of 95% petrolatum and 5% low-density polyethylene.

In order to further provide a waterproof protection for the cable 21, additional amounts of the waterproofing compound are placed in a space 32 between the core wrap 26 and the corrugated tape 27, as well as in a space 33 between the corrugated tape and the jacket 29. The filled cable 21, as illustrated in FIG. 2, provides a cable which has proven to be substantially impervious to moisture. It thereby provides sufficient moisture-barrier protection for the conductors 23—23 of the cable 21, and, consequently, essentially eliminates all of the attendant disadvantages experienced when moisture diffuses into the core of cables used in the communications industry.

The stranded structure of the cable core 22 is arranged so that air voids exist throughout the cross sectional configuration of the core. Consequently, it is difficult to insure that the air voids of the centermost interstices 31—31 will be filled with as much waterproofing compound as the air voids of the outermost interstices. Therefore, techniques and apparatus had to be developed which can facilitate the application of the waterproofing compound to the cable core 22 in such a manner that substantially all voids of the interstices 31—31 of the core are filled with the compound.

Referring to FIG. 3, there is illustrated a compound-applying apparatus, designated generally by the numeral 34, which facilitates the application of the waterproofing compound into the interstices 31—31 of the cable core 22 in accordance with certain principles of the invention. The apparatus 34 includes a support frame 36 mounted on a stationary floor 37. The apparatus 34 further includes a lead-in tube 35 which provides a pressure-gradient entry of the core 22 into the apparatus 34. The apparatus 34 also includes a first constrictor section, designated generally by the numeral 38, which is connected to the trailing end of the lead-in tube 35.

As illustrated in FIG. 4, the constrictor section 38 includes a pair of spaced flange rings 39 and 41 which are threadedly secured to opposite ends of an interconnecting sleeve 42. A plurality of constricting members 43—43 and a spacer 44 are positioned within the sleeve 42. A pair of locking rings 46 and 47 are threadedly secured to opposite ends of the sleeve 42 to lock the constricting members 43—43 and the spacer 44 in the aligned orientation as illustrated in FIG. 4. Each of the constricting members 43—43 is formed with a central opening having portions which have an internal diameter substantially equal to the external diameter of the cable core 22. Consequently, as the cable core 22 passes through the openings of the constricting members 43—43, an essentially air-tight seal is formed at the entry of the core into the compound-applying apparatus 34.

Referring again to FIG. 3, a first vacuum section, designated generally by the numeral 48, forms a portion of the apparatus 34 and is connected at one end thereof to the constrictor section 38. A vacuum pump (not shown) is connected to the first vacuum section 48 for developing a suction within the section to extract air from the interstices 31—31 (FIG. 2) of the cable core 22.

As illustrated in FIG. 5, the vacumm section 48 includes a sleeve 49 having a pair of flange members 51 and 52 secured to opposite ends thereof. A pair of tubes 53 and 54 form passageways which communicate with an inner chamber 56 formed by the internal wall of the sleeve 49. The tubes 53 and 54 are connected to the associated vacuum pump to create the suction within the vacumm section 48 to facilitate the extraction of air from the interstices 31—31 of the cable core 22.

An outer sleeve 57 is concentrically mounted about an intermediate portion of the sleeve 49 and forms an inner chamber 58 which can be utilized to permit the passage of a heating medium about the sleeve 49 if required.

As further illustrated in FIG. 3, a second constrictor section, designated generally by the numeral 59, which is identical to the first constrictor section 38, is connected at one end thereof to the opposite end of the first vacuum section 48. The second constrictor section 59 provides for an essentially air-tight passageway for the cable core 22 from the vacuum section 48 into a second vacuum section, designated generally by the numeral 61. The second vacuum section 61 is identical to the first vaccum section 48 and is also connected to a vacuum pump (not shown) for developing a suction within the section to assist in extracting air from the interstices 31—31 of the cable core 22. The first vacuum section 48 extracts essentially 85% of the air from the interstices 31—31 of the cable core 22. The second vacuum section 61 extracts essentially an additional 5% of the volume of air apparent in the interstices of the cable core prior to the entry of the core into the first constrictor section 38.

The second vacuum section 61 is attached at the opposite end thereof to one end of an insulated constrictor section, designated generally by the numeral 62.

As illustrated in FIG. 6, the constrictor section 62 includes an inner sleeve 63 and a pair of flange members 64 and 66 threadedly secured to opposite ends thereof. Three constricting members 65—65 are positioned within the central opening of the sleeve 63 and are separated by a pair of spacers 68—68. A pair of locking rings 69 and 71 are threadedly secured to opposite ends of the sleeve 63 to retain the constricting members 67—67 and the spacers 68—68 in the orientation as illustrated in FIG. 6.

Each of the spacers 68—68 is formed with an opening 72 which forms a passageway communicating with an opening 73 formed in an intermediate portion of the sleeve 63. An outlet tube 74 is attached to the inner sleeve 63 and is formed with a central opening 75 which communicates with the opening 73 of the sleeve.

An outer sleeve 76 is positioned concentrically about the sleeve 63 and is held in the orientation as illustrated in FIG. 6 between the flange members 64 and 66. A pair of tubes 77 and 78 are attached to the sleeve 76 and provide passageways which communicate with a chamber 79 formed between the outer wall of the inner sleeve 63 and the inner wall of the outer sleeve 76. A composition of insulating material 81 is placed over the outer surface of the sleeve 76 to facilitate the retention of heat within the constrictor section 62 where the heat emanates from a medium, such as steam, being circulated through the chamber 79.

The smaller inner diameter portions of the constricting members 67—67 are substantially the same size as the outer diameter of the cable core 22. This feature provides a seal between subsequent compound-applying facilities and the vacuum sections 48 and 61 which essentially precludes any of the waterproofing compound from being drawn into the vacuum sections and, subsequently, into the vacuum pump.

Referring agin to FIG. 3, the opposite end of the constrictor section 62 is connected to one end of an insulated cooling section, designated generally by the numeral 82.

As illustrated in FIG. 7, the insulated cooling section 82 includes a sleeve 83 extending between and attached at opposite ends thereof to flange members 84 and 86. The axis of a central passage 88 of the sleeve 83 is aligned with the axis of central openings 89 and 91 formed in the flange members 84 and 86, respectively. A chamber 92 is formed within the sleeve 83 to permit the circulation of a cooling medium such as water therein. An inlet pipe 93 and an outlet pipe 94 are attached to the sleeve 83 to permit the continuous circulation of the cooling medium through chamber 92. A composition insulation 95 is placed over the sleeve 83 to retain the temperature of the cooling medium at a consistent level.

A removable sleeve 95 is formed with flanges 97 and 98 at opposite ends thereof and is insertable within the central passage 88 of the sleeve 83. The removable sleeve 96 is retained within the central passage 88 of the sleeve 83 by a pair of locking rings 99 and 101 which are threadedly securable to opposite ends of the inner sleeve as illustrated in FIG. 7.

The flanges 97 and 98 and the locking rings 99 and 101 seal the sleeve 96 within the chamber 92. Thus the cooling medium can be circulated about the sleeve 96 to cool a central passageway 102 of the sleeve and any cable core 22 which may be passing therethrough.

The removable sleeve 96 is formed with the central opening 102 which is of sufficient size to provide movement axially therethrough by the cable core 22. Since different size cable cores 22—22 will require the application of a waterproofing compound thereto, the removable sleeve 96 will have to be exchanged at selected periods to accommodate the different sizes of cable cores. For example, the cable core 22 could include 25, 50, 100 or 200 twisted pairs of conductors 23—23 (FIG. 1); however, the diameter of the flanges 97 and 98 of each of the removable sleeves 96—96 will be the same so that any removable sleeve will fit within the central passage 88 of the sleeve 83.

Referring again to FIG. 3, the cooling section 82 is connected at the opposite end thereof to one end of a constrictor section, designated generally by the numeral 103, which is identical in structure to the constrictor section 38. The constrictor section 103 is connected at the opposite end thereof to one end of a compound-applying section, designated generally by the numeral 104.

As illustrated in FIG. 8, the compound-applying section 104 includes an inner sleeve 105 attached at opposite ends thereof to end plates 106 and 107. The central opening of the sleeve 105 is axially aligned with openings 108 and 109 formed in the end plates 106 and 107, respectively. An outer sleeve 111 is positioned concentrically about an intermediate portion of the inner sleeve 105 and is spacely displaced from the inner sleeve 105 to form a chamber 112 therebetween. The ends of the outer sleeve 111 are closed to seal the chamber 112 except for an inlet pipe 113 and an outlet pipe 114 which permit the circulation of steam through the chamber and around the intermediate portion of the inner sleeve 105. An inlet pipe 116 is connected to the inner sleeve 105 to permit the low-pressure movement of the waterproofing compound into the sleeve 105. An outlet pipe 117 having a valve is provided for cleaning the compound from within the sleeve 105 when the compound-applying section 104 is not being used. Otherwise the valve of the pipe 117 is closed to keep the compound within the sleeve 105 under a low pressure.

The end plate 107 of the compound-applying section 104 is connected to one end of a constrictor section, designated generally by the numeral 118, as illustrated in FIG. 3. The constrictor section 118 is identical in structure to the constrictor section 38. The constrictor section 118 is connected at the opposite end thereof to one end of a temperature-gradient section, designated generally by the numeral 119, which is similar to the compound-applying section 104, but does not include the entry and exit pipes 116 and 117. The purpose of the temperature-gradient section 119 is to permit successive sections of the cable core 22, with the recently applied hot waterproofing compound, to pass through an area which is not heated. This procedure assists in gradually reducing the temperature of the hot waterproofing compound of the successive sections of the cable core 22. During the passage of the cable core 22 through the temperature-gradient section 119, the waterproofing compound becomes less fluid and tends to solidify by approaching a jelly-like consistency.

The temperature-gradient section 119 is connected at the opposite end thereof to a constrictor section, designated generally by the numeral 121, which is identical in structure to the constrictor section 38. The constrictor section 121 is connected at the opposite end thereof to one end of a cooling section 122. The cooling section 122 is similar to the insulated cooling section 82 except that the cooling section 122 does not include the removable sleeve 96 and does not have the composition insulation 95 surrounding the sleeve 83. As successive sections of the cable core 22 pass through the cooling section 122, the waterproofing compound contained within the interstices 31—31 of the successive sections are cooled and become somewhat solidified to the extent that the compound is no longer in a freely flowable condition but has now assumed the jelly-like consistency. The cooling procedure will permit the compound to be retained within the interstices 31—31 of the cable core 22 as the core exits from the opposite end of the cooling section 122 and into the atmosphere.

The cable core 22 containing the waterproofing compound is then passed through a series of operations whereat the core wrap 26 (FIG. 2) is wrapped longitudinally about the cable core. Additional amounts of the waterproofing compound are injected onto the cable core 22 and aligned coincidental with a subsequently formed longitudinal seam of the core wrap 26. A band or ribbon is then wrapped helically about the core wrap 26. Thereafter the corrugated aluminum shielding tape 27 (FIG. 2) is wrapped longitudinally about the core wrap 26.

As the corrugated aluminum shielding tape 27 is being formed for subsequent longitudinal wrapping about the cable core 22 and the core wrap 26, the cable core and the core wrap are passed through a mandrel into which is injected additional amounts of the waterproofing compound immediately prior to the longitudinal forming of the aluminum shielding tape about the core wrap. This aspect of the operation is covered in a co-pending application, Ser. No. 69,837, filed in the name of L. D. Moody on Sept. 4, 1970.

Thereafter the cable core 22, having the core wrap 26 and the corrugated aluminum shielding tape 27, is passed through a bath (not shown) of the waterproofing compound so that the compound fills essentially the valleys of the corrugations of the aluminum shielding tape 27. The cable core 22 with the core wrap 26 and the aluminum shielding tape 27 is then passed through an extruder head where the polyethylene jacket 27 (FIG. 2) is applied over the corrugated aluminum shielding tape. The jacketed product is then passed through a cooling trough (not shown) and onto a take-up reel (not shown).

Referring now to FIG. 9, there is illustrated a compound preparation area, designated generally by the numeral 123, which includes a heating tank 124 positioned on the stationary floor 37. Commercially available petrolatum is pumped from a drum 126 through a conduit 127 and into the heating tank 124. The petrolatum is heated to a temperature of about 150° F. in the tank 124 and is circulated through a header tank 128. Selected amounts of the heated petrolatum are passed through a conduit 129 from the header tank 128 to a metering pump 131 and then through a heat exchanger 132 where the temperature of the petrolatum is raised to approximately 265° F. The heated petrolatum is then pumped from the heat exchanger 132 into a mixing vessel 133.

An extruder 134 heats low-density polyethylene to a temperature of approximately 265° F. and discharges the heated polyethylene into the mixing vessel 133 where the low-density polyethylene is mixed with the petrolatum to form the waterproofing compound. The metering pump 131 facilitates the essentially precise mixture of petrolatum with the polyethylene in the mixing vessel 133. In this manner, a blend of waterproofing compound within the aforementioned range of mixture is obtained from the mixing vessel 133. For example, an acceptable mixture could contain 94% petrolatum and 6% low-density polyethylene.

A pump 136 facilitates the pumping of the prepared waterproofing compound from the mixing vessel 133 to the various points of compound application along the manufacturing line. For example, as illustrated in FIG. 9, a conduit 137 facilitates the transfer of the waterproofing compound from the mixing vessel 133 to the compound-applying section 104.

OPERATION

Referring to FIGS. 3 and 9, the cable core 22 is moved axially from a supply stand (not shown) and through the in-line elements of the compound-applying apparatus 34. Successive sections of the cable core 22 pass through the pressure-gradient lead-in tube 35 and into and through the constrictor section 38. Because of the essentially close openings of the constricting members 43—43 (FIG. 4), the constrictor section 38 forms an essentially air-tight entry point for the cable core 22 into the compound-applying apparatus 34. Thereafter the successive sections of the cable core 22 pass through successive vacuum sections 48 and 61 whereat substantially all of the air, which exists within the interstices 31—31 (FIG. 2) of the successive sections of the cable core, is extracted therefrom. It is noted that, although two vacuum sections 48 and 61 are shown in the compound-applying apparatus 34, sufficient air can be extracted from the interstices 31—31 of the cable core 22 by using a single vacuum section.

The successive, air-evacuated sections of the cable core 22 are then passed through the heated constrictor section 62 and the insulated cooling section 82 and subsequently through the compound-applying section 104. The waterproofing compound is fed into the section 104 through the entry pipe 116 and is maintained in the section under a low pressure. In this manner, the waterproofing compound is drawn into the air-evacuated interstices 31—31 whereby the compound occupies substantially the entire volume of the interstitial structure of the cable core 22.

Even though the constrictor sections 62 and 103 are located between the compound-applying section 104 and the vacuum sections 48 and 61, it is feasible that the waterproofing compound could be drawn undesirably from the compound-applying section and into the vacuum sections under the suction generated by the vacuum pumps. However, as the waterproofing compound is drawn into the insulated cooling section 82, the compound tends to solidify into a jelly-like consistency and become less flowable. As the cooled compound enters the heated constrictor section 62, the compound is reheated and flows through the openings 72—72 and the tube 74 which are illustrated in FIG. 6. In this manner, essentially all of the waterproofing compound which tend to approach the vacuum sections 48 and 61 is diverted at the heated constrictor section 62 and is thereby prevented from entering the vacuum sections and the vacuum-generating system.

As previously explained, the successive sections of the cable core 22 which exit from the compound-applying section 104 are passed through the temperature-gradient section 119 which permits the controlled reduction of the temperature of the waterproofing compound contained within the interstices 31—31 of the cable core. Further, the successive sections of the cable core 22 are then passed through the cooling section 122 to prepare finally the compound for the exiting of the cable core into the atmosphere. The cooled compound assumes the jelly-like consistency, will not flow and will remain within the interstices of the cable core 22 to provide a cable core wherein essentially the entire interstitial structures of the core is filled with the waterproofing compound.

It is particularly significant to note that the compound of jelly-like consistency within the interstices 31—31 of the cable core 22 has been cooled rapidly prior to exiting from the cooling section 122 and into the atmosphere. This action provides a compound within the interstices 31—31 which is self-supporting within the core 22 and does not require an external covering.

The subsequent applications of the waterproofing compound as the core wrap 26 is being applied and prior to the forming of the aluminum shielding tape 27 about the core wrap, as described in the aforementioned L. D. Moody application, further facilitates the waterproofing of the subsequent cable 21. In addition, the application of the waterproofing compound about the corrugated aluminum shielding tape 27 prior to the application of the polyethylene jacket 29 further enhances the waterproofing quality of the ultimate cable 21.

Although not illustrated in the figures, wiper dies could be utilized at various locations within the compound-applying apparatus 34 subsequently to the application of the waterproofing compound to the cable core 22 with an accommodating drain to remove any excess compound wiped from the moving cable core 22 by the dies. In addition, splash shields could be utilized along the path of movement of the cable core 22 and prior to the entry of the core into the compound-applying section 104.

Referring now to FIG. 10, there is illustrated a representation of a cooling section, designated generally by the numeral 138, which is an alternate embodiment of and can be used as a replacement for the cooling section 82. The cooling section 138 includes a sleeve 139 extending between and attached to end plates 141 and 142. The end plates 141 and 142 are formed with central openings having bevelled surfaces 143 and 144, respectively. Rubber rings 146 and 147 are positioned within grooves formed in the bevelled surfaces 143 and 144, respectively. The end plate 141 is formed with a circular extension 148 having a threaded periphery 149.

A removable sleeve 151 is secured to circular flange members 152 and 153 at opposite ends thereof. Peripheries 154 and 156 of the flange members 152 and 153, respectively, are bevelled as illustrated in FIG. 10 to complement the bevel of the surfaces 143 and 144 of the end plates 141 and 142, respectively. The removable sleeve 151 can be inserted into the sleeve 139, as illustrated in FIG. 10 to a position whereat the bevelled periphery 156 engages the rubber ring 147 to form a seal in the right end of the cooling section 138. The bevelled periphery 154 of the flange member 152 engages the rubber ring 146 to form a seal in the left end of the cooling section 138 whereby a chamber 157, formed between the sleeves 139 and 151, is sealed. The removability of the sleeve 151 permits the interchangeability of sleeves of different diameters to receive cable cores 22—22 of correspondingly different diameters. In addition, the flange members 152 and 153 of all sleeves 151—151 are the same size.

A cap 158, having a central passageway 159 formed axially therethrough and further formed with an internally threaded portion 161, is threadedly attached to the extension 148 and abuts the outer surface of the flange member 152 to lock the removable sleeve 151 within the sleeve 139. Conduits 162 and 163 are attached to the sleeve 139 to facilitate the continuous circulation of a cooling medium, such as chilled water, through the chamber 157 and about the removable sleeve 151.

A pair of air cylinders 164 and 166 are attached to the outer surface of the sleeve 139 and are provided with piston rods 167 and 168, respectively. Movement of the piston rod 167 controls a circular slide 169 which is formed with a plurality of keyways 171—171 for guiding movement of the slide over a plurality of keys 172—172 which extend radially from the outer surface of the sleeve 139. The slide 169 also moves over a rubber ring 173 mounted in a groove formed in the periphery of the end plate 141.

Movement of the piston rod 168 controls a circular slide 174 at the opposite end of the cooling section 138 by permitting sliding movement of keyways 176—176, formed in the slide, over keys 177—177 formed radially in the outer surface of the sleeve 139. A rubber ring 178 is positioned within a groove formed in the periphery of the end plate 142 to further provide a rolling surface for the slide 174.

While not illustrated in FIG. 10, the cooling section 138 could include a composition insulation positioned about the outer surface of the sleeve 139 to insulate the section so that the cooling properties of the section are maintained at a desired level.

The cooling section 138 can be attached to a pivotal support (not shown) extending perpendicular to the axis of the cooling section and supported for pivoting movement some distance from the axis of the section. For example, the cooling section 138 could replace the cooling section 82 which is illustrated in FIG. 3. The pivotal support for the cooling section 138 would extend downwardly and would be attached to a fixed member (not shown) having an axis which is parallel to the axis of the in-line components of the compound-applying apparatus 34.

When it is desired to change the removable sleeve 151 for a sleeve having a central passageway of a different diameter to facilitate the passage of the cable core 22 of a different size, the cooling section 138 is pivoted from its in-line position in the apparatus 34. The cap 158 is removed and the removable sleeves 151—151 are exchanged. Since the size of the flange members 152 and 153 of all of the removable sleeves 151—151 are the same, the newly inserted removable sleeve will again form a seal with the rubber rings 146 and 147. The cap 158 is then reapplied threadedly to the extension 148 to lock the newly inserted sleeve 151 within the sleeve 139. The cooling section 138 is then pivoted back to a position which aligns the axis of the section with the in-line axis of the other components of the apparatus 34.

Figure 11:
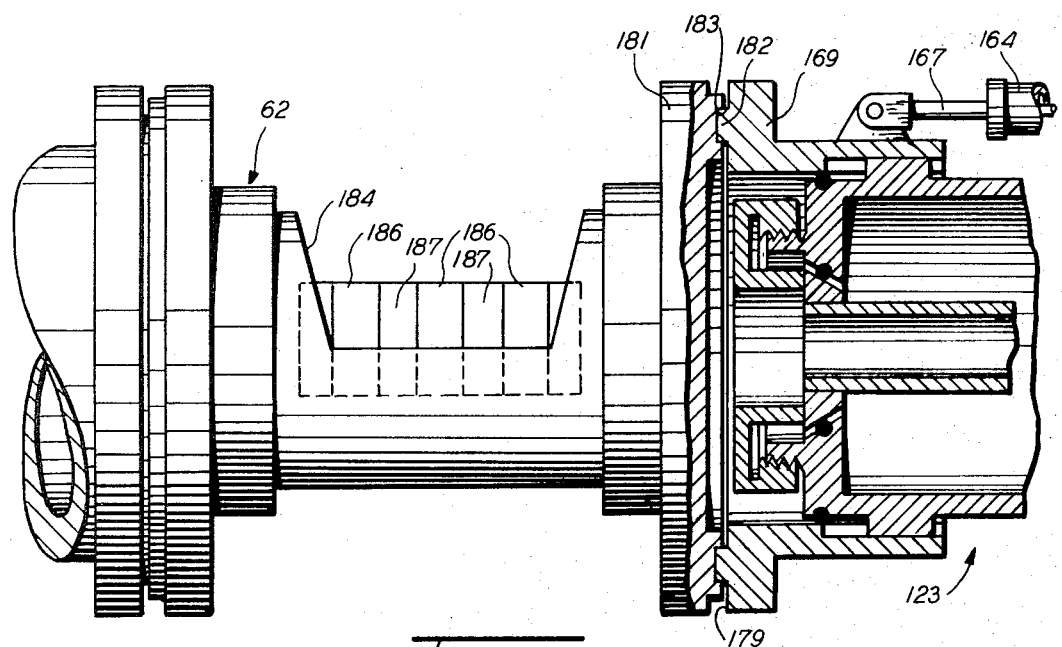
FIG. 11 is a sectional view showing the removable cooling section of FIG. 10 in assembly with a constrictor section.

Referring now to FIG. 11, after the cooling section 138 has been returned to the axially aligned position with the in-line components of the apparatus 34, the air cylinder 164 is controlled to move the piston rod 167 to the left so that a face 179 of the slide 169 is moved toward an adjacent flange ring 181 of the insulated constrictor section 62. The face 179 of the slide 169 is formed with a circular projection 182 which is moved into a circular groove 183 formed in the adjacent face of the flange ring 179.

Referring again to FIG. 10, the air cylinder 166 is controlled to move the slide 174 into similar engagement with the adjacent flange ring of the constrictor section 103 (FIG. 3) whereby the cooling section 138 is locked in axial alignment with the remaining components of the compound-applying apparatus 34.

Utilization of the cooling section 138 in the manner just described permits the exchange of removable sleeves 151—151 without disturbing any insulation which is mounted about the sleeve 139 and permits a relatively fast and expedient exchange of the removable sleeves.

Referring again to FIG. 11, the constrictor section 62 is illustrated as having an open top 184. The representation of the open top 184 illustrates another embodiment for the constrictor sections 38, 59, 62, 103, 118 and 121 wherein a hinged top (not shown) is moveable relative to the remaining portion of the constrictor section to expose the constricting members and spacers therein. For example, constricting members 186—186 and spacers 187—187 are illustrated in FIG. 11. By providing a hingeable top for the constrictor sections of the apparatus 34, the constricting members can be quickly changed to facilitate different sizes of cable cores 22—22.

Thus the methods of and apparatus for applying a waterproofing compound to the cable core 22 provides a relatively air-tight assembly of axially aligned components for extracting air from the interstices 31—31 of the core, applying the compound into the air-evacuated interstices and conditioning the compound to a jelly-like state so that the compound remains within the interstitial structure of the core without the necessity for an external covering to retain the compound therein. In addition, the cooling features of the apparatus 34 provide a relatively clean vacuum operation whereby essentially no portions of the compound are drawn into the vacuum sections of the apparatus. Further, the interchangeable features of the cooling section 138 further enhance the rapid exchange of different sizes of facilities within the apparatus when a cable core of a size different from the previous cable core is to be passed through the apparatus.

What is claimed is:

1. A method for applying a compound to a stranded article, which comprises the steps of:

moving successive portions of the stranded article through at least one air-evacuation section whereat air is evacuated from interstices of the successive portions of the stranded article;

moving the air-evacuated successive portions of the stranded article through a compound-applying section;

moving amounts of the compound in a semifluid state into the compound-applying section and into contact with the successive portions of the stranded article to facilitate the drawing of portions of the semifluid compound into the stranded article;

moving the compound-filled stranded article through an area whereat the semifluid compound is conditioned to place the compound in a jelly-like state so that the compound is nonflowable and is retained within the interstices of the stranded article independently of any other supporting structure;

cooling the air-evacuated successive portions of the stranded article after the portions have been moved through the air-evacuation section and prior to the entry of the portions into the compound-applying section to place in a jelly-like state any portions of the compound which are drawn from the compound-applying section toward the air-evacuated section to preclude entry of the compound into the air-evacuation section;

preheating petrolatum to a selected temperature;

pumping selected amounts of the preheated petrolatum into a mixing tank;

extruding selected amounts of low-density polyethylene into the mixing tank at a temperature consistent with the preheated temperature of the petrolatum;

mixing selected preheated amounts of the petrolatum and the low-density polyethylene with the mixing tank to prepare a blended compound of the petrolatum and polyethylene; and pumping the blended compound directly from the mixing tank to the compound-applying section.

2. The method as set forth in claim 1 wherein the petrolatum and low-density polyethylene are preheated to a temperature of about 265° F.

3. The method as set forth in claim 1 wherein the petrolatum-polyethylene mixture is within a range of from 85% petrolatum and 15% polyethylene to 95% petrolatum and 5% polyethylene.

References Cited

UNITED STATES PATENTS 3,672,974    6/1972    Tomlinson _____ 117—119
3,068,533   12/1962    Raimondi _____ 117—232

MAYER WEINBLATT, Primary Examiner

U.S. Cl. X.R.

117—115, 119, 213, 232; 156—47, 48

UNITED STATES PATENT OFFICE
CERTIFICATE OF CORRECTION

Patent No. 3,832,215      Dated August 27, 1974

Inventor(s) Edward L. Franke, Jr. et al.

It is certified that error appears in the above-identified patent and that said Letters Patent are hereby corrected as shown below:

The original front page should be canceled and the attached page substituted therefor.

Signed and sealed this 17th day of December 1974.

(SEAL)
Attest:

McCOY M. GIBSON JR.
Attesting Officer

C. MARSHALL DANN
Commissioner of Patents